United States Patent [19]

Liu

[11] Patent Number: 6,118,903
[45] Date of Patent: Sep. 12, 2000

[54] IMAGE COMPRESSION METHOD AND APPARATUS WHICH SATISFIES A PREDEFINED BIT BUDGET

[75] Inventor: Qin Liu, Milpatas, Calif.

[73] Assignee: Nokia Mobile Phones, Ltd., Espoo, Finland

[21] Appl. No.: 09/116,563

[22] Filed: Jul. 15, 1998

[30] Foreign Application Priority Data

Jul. 18, 1997 [FI] Finland .................................. 973042

[51] Int. Cl.⁷ .................................................. G06K 9/36
[52] U.S. Cl. ........................ 382/245; 382/239; 382/251; 348/405; 348/419; 358/261.2
[58] Field of Search .................................. 382/244–246, 382/248, 250–251, 253, 239, 232, 261, 270–273; 358/261.1–261.2, 430, 427, 432–433; 348/403–408, 395, 419; 341/51, 59, 65, 67

[56] References Cited

U.S. PATENT DOCUMENTS

| | | | |
|---|---|---|---|
| 5,025,482 | 6/1991 | Murakami et al. | 382/239 |
| 5,086,488 | 2/1992 | Kato et al. | 382/239 |
| 5,142,380 | 8/1992 | Sakagami et al. | 358/432 |
| 5,333,211 | 7/1994 | Kanda et al. | 382/261 |
| 5,333,212 | 7/1994 | Ligtenberg | 382/250 |
| 5,473,376 | 12/1995 | Auyeung | 348/403 |
| 5,629,780 | 5/1997 | Watson | 358/432 |
| 5,654,760 | 8/1997 | Ohtsuki | 348/405 |
| 5,710,595 | 1/1998 | Hang et al. | 348/419 |
| 5,790,195 | 8/1998 | Ohsawa | 348/419 |
| 5,835,149 | 11/1998 | Astle | 348/419 |
| 5,926,569 | 7/1999 | Nickerson | 382/232 |

FOREIGN PATENT DOCUMENTS

| | | | |
|---|---|---|---|
| 0 414 074 A2 | 8/1988 | European Pat. Off. | H04N 7/133 |
| 0 490 540 A3 | 6/1992 | European Pat. Off. | |
| 0 514 188 A2 | 11/1992 | European Pat. Off. | |
| 0 555 095 A3 | 8/1993 | European Pat. Off. | |
| 0 743 793 A2 | 11/1996 | European Pat. Off. | |
| 0 762 775 A2 | 3/1997 | European Pat. Off. | |
| 0 861 003 A2 | 8/1998 | European Pat. Off. | H04N 7/30 |
| WO 93/19434 | 9/1993 | WIPO. | |
| WO 95/03673 | 2/1995 | WIPO. | |
| WO 97/16029 | 5/1997 | WIPO. | |
| WO 97/17675 | 5/1997 | WIPO. | |

OTHER PUBLICATIONS

PCT International Search Report.
Finnish Official Action.
"The JPEG Still Picture Compression Standard" Communications of the ACM, Wallace, G.K., Apr. 1991, pp. 1–17.
CCITT Recommendation T.81, "Digital Compression and Coding of Continuous–Tone Still Images—Requirements and Guidelines", Annex K, pp. 143–182.

Primary Examiner—Leo H. Boudreau
Assistant Examiner—Ishrat Sherali
Attorney, Agent, or Firm—Perman & Green, LLP

[57] ABSTRACT

A DCT based lossy compression method for compressing a digitized image composed of a matrix of image samples to provide a compressed image which satisfies a predefined bit budget. The digitized image is first sub-divided into blocks (e.g. of size 8×8 pixels). A discrete cosine transform (DCT) comprising a set of DCT coefficients is then derived for each block. A quantization table is selected from a set of quantization tables and, using the selected table, the coefficients of each DCT are quantized. A zero-value index, corresponding to the average number of zero value quantized DCT coefficients per DCT, is determined. A predicted zero-value index is calculated using said predefined bit budget and a quantization table selected from said set of tables using the determined index and the predicted index. Using that selected table, the unquantized coefficients of the DCTs are re-quantized and the requantized coefficients compressed using run-length encoding and Huffman encoding.

8 Claims, 4 Drawing Sheets

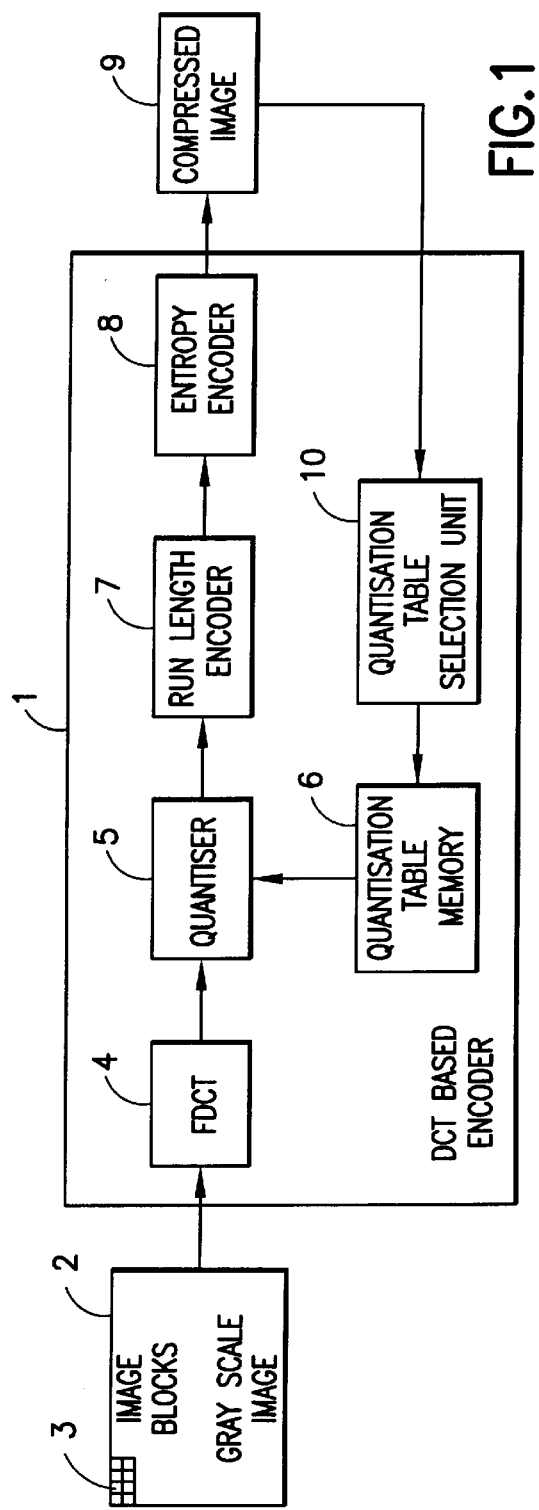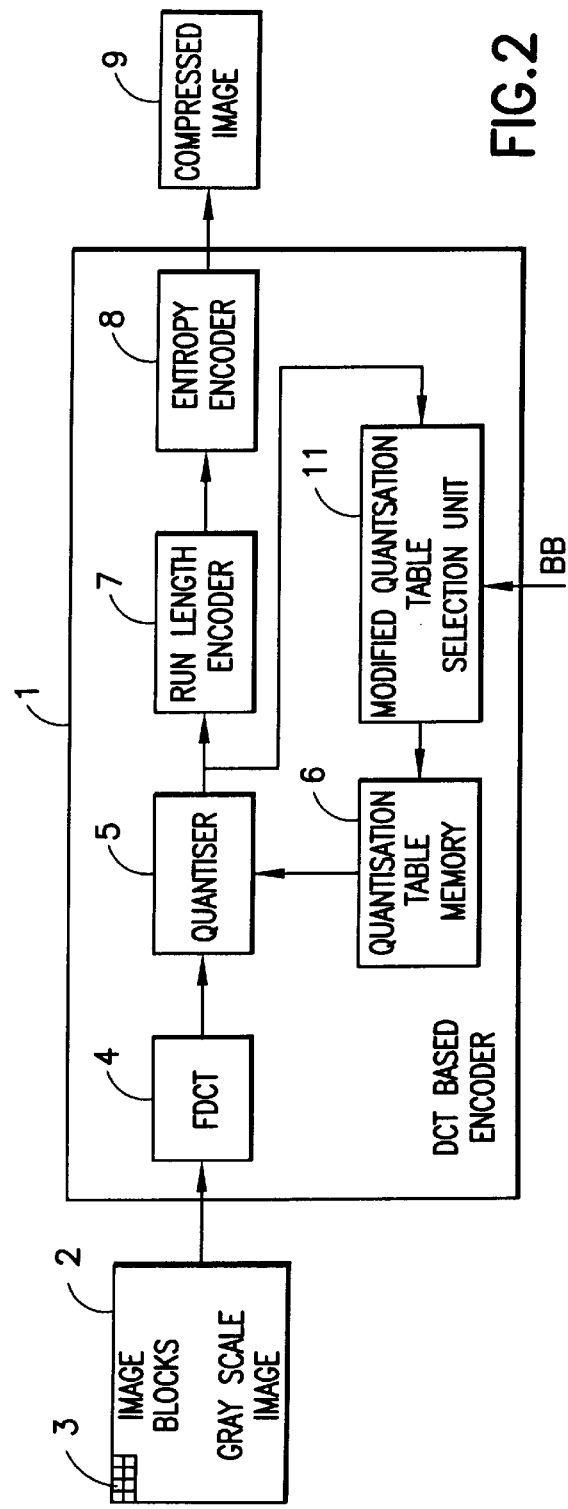

1

IMAGE COMPRESSION METHOD AND APPARATUS WHICH SATISFIES A PREDEFINED BIT BUDGET

FIELD OF THE INVENTION

The present invention relates to a method and apparatus for compressing a digitised image.

BACKGROUND OF THE INVENTION

Currently, the most widely used standard for the compression of continuous-tone still images, both greyscale and colour, is that known under the acronym JPEG, after the Joint Photographic Experts Group. JPEG specifies inter alia a discrete cosine transform (DCT) based method for the lossy compression of still images.

A DCT based encoder 1 employing JPEG is shown schematically in FIG. 1 (see Wallace, G. K. "The JPEG Still Picture Compression Standard" Communications of The ACM, April 1991). For a digitised greyscale image 2 which is composed of a matrix of pixel intensity values (e.g. 512×480), the image is first subdivided into 8×8 pixel blocks 3. The pixel blocks 3 are fed in sequence to the encoder 1 which has at its input a forward DCT (FDCT) unit 4. The DCT is related to the discrete Fourier transform (DFT), such that the FDCT unit 4 effectively transforms each 8×8 block 3 into 64 orthogonal basis signals or DCT coefficients, each of which corresponds to one of 64 "spatial frequencies". In effect, the DCT represents the frequency spectrum of the input block 3. The DCT coefficient with zero frequency in both dimensions is the "DC" coefficient and the remaining 63 coefficients are the "AC" coefficients. It is a general property of images that pixel intensity values vary slowly from pixel to pixel across the image. Thus, for a typical 8×8 sample block 3 from a typical source image, most of the DCT coefficients have zero or near-zero amplitude.

Following the FDCT unit 4, each DCT is provided to a quantiser unit 5 which quantises the DCT coefficients using a 64-element quantisation table stored in a table specification memory 6. The elements of the quantisation table specify the quantisation step size for respective DCT coefficients. In practice, the quantisation table used is either a 'base' table stored in the memory 6 (CCITT Recommendation T.81, "Digital Compression and Coding of Continuous-Tone Still Images—Requirements and Guidelines", Annex K) or a table generated by uniformly scaling the elements of the base table. Typically, 100 different tables are defined corresponding to a range of quality levels, Q=1 to 100, where the base table corresponds to a quality level Q=50. It is noted that within any one quantisation table, the quantisation step sizes may vary from element to element.

After quantisation, the quantised coefficients of each DCT are provided to a run length encoder 7 as a data stream, the coefficients being ordered according to increasing frequency. The run length encoder 7 takes advantage of consecutive zeros in this data stream to compress the data. As has already been noted, for a typical image block the DCT coefficients tend to be small so that, after quantisation, the number of zeros in the DCT data stream is likely to be great. Run-length encoding may therefore achieve a significant level of compression. Finally, the run length encoded data stream is provided to an entropy encoder 8, which further compresses the data stream using, for example, Huffman coding, to generate a compressed 'image' 9.

In many applications, the number of bits which can be used to represent a compressed image is predefined. One such application is the proposed transmission of still images via the short message service (SMS) provided for by the cellular telephone standard GSM. The maximum length of a single concatenated short message is 34170 (255×134) octets (or bytes). In order to allow a still image to be transmitted by a single concatenated short message, the compressed image must therefore occupy less than 34170 octets.

However, because the spectral characteristics of different images can differ greatly, it is extremely hard to predict the size of the compressed image which will be produced by using a particular quantisation table (or Q value). The general practice in order to satisfy a predefined bit budget is to select a quantisation table on the basis of past experience, and to apply this to obtain a compressed image. If the compressed image does not satisfy the bit budget, a second quantisation table is selected via a quantisation table selection unit 10 and a new compressed image generated. This process is carried out on a "trial and error" basis until a compressed image is obtained which satisfies the bit budget.

It will be appreciated that the trial and error nature of the compression method outlined above is inefficient in so far as the quantisation and encoding steps often have to be repeated many times before a compressed image is obtained which satisfies the bit budget.

SUMMARY OF THE INVENTION

According to a first aspect of the present invention there is provided a method of compressing a digitised image composed of a matrix of image samples to provide a compressed image which satisfies a predefined bit budget, the method comprising the steps of:

1) dividing the digitised image into blocks and deriving for each block an energy-packing transform comprising a set of transform coefficients;

2) selecting a quantisation table from a set of quantisation tables and using the selected table to quantise the coefficients of each transform;

3) deriving a zero-value index indicative of the number of zero-value quantised transform coefficients;

4) determining a predicted zero-value index using said predefined bit budget;

5) selecting a quantisation table from said set of tables using the derived index and said predicted index and using that selected table to quantise the coefficients of each transform; and 6) compressing the coefficients quantised in step 5) using run-length encoding.

Embodiments of the present invention enable a compressed image to be generated, which satisfies a predefined bit budget, using only a single encoding step 6).

The compressed image may be divided into blocks of any suitable size. The blocks may be contiguous or overlapping. Typically however, the blocks are contiguous and each is composed of 8×8 pixels.

Preferably, said energy-packing transform is a discrete Fourier transform (DCT). Alternative energy-packing transforms may be used however, such as a Karhunen-Loeve transform.

For a greyscale image, said image samples are greyscale intensity values. For a colour image, a matrix of image samples may be provided for each of a set of colours, e.g. red, blue, and green, and the matrices processed separately according to the method of the invention. The compressed image comprises a combination of the compressed coefficient sets. Alternatively, and in order to increase the compression ratio further, luminance (Y) and chrominance (U,V) matrices may be generated from the red, blue and green colour matrices. Again, the luminance and chrominance matrices are processed separately according to the above method.

Preferably, said zero-value index is the average number of zero-value quantised transform coefficients in the transforms. Alternatively however, the median or another representative value may be used.

Preferably, step 3) comprises deriving zero-value indices for each of a plurality of different quantisation tables to provide a zero-value index vs quantisation table relationship. It is however not necessary to requantise the transform coefficients for each additional quantisation table. Rather, the additional zero-value indices can be derived from the first obtained set of quantised coefficients.

Preferably, the method comprises obtaining a reference zero-value index vs bit budget relationship by:

7) dividing a digitised test image into blocks and deriving for each block an energy packing transform comprising a set of transform coefficients;
8) selecting a quantisation table from a set of quantisation tables and using the selected table to quantise the coefficients of each transform;
9) deriving a zero-value index indicative of the number of zero-value quantised transform coefficients;
10) compressing the coefficients quantised in step 5) using run-length encoding;
11) determining the bit size of the compressed image;
12) repeating steps 7) to 11) for a plurality of different quantisation tables to obtain a zero-value vs bit size relationship for the test image; and
13) repeating steps 7) to 12) for a plurality of different test images and combining the resulting relationships to obtain the reference zero-value index vs bit budget relationship,
wherein this relationship is used in step 4) to determine the predicted zero-value index using the predefined bit budget.

Step 5) then comprises using the predicted zero-value index and the zero-value index vs quantisation table relationship for the image to be compressed, to select the quantisation table. This selection may comprise interpolating between the zero-values of the derived set of zero-values which neighbour the predicted zero-value.

In order to ensure that the final compressed coefficient set satisfies the predefined bit budget, the selection of the final quantisation table is preferably a conservative one. For example, the predefined bit budget may actually be less than the actual number of bits which can be transmitted, stored or otherwise processed.

Preferably, steps 6) and 10) comprise entropy encoding the data, e.g. using Huffman encoding, following run-length encoding.

According to a second aspect of the present invention, there is provided apparatus for compressing a digitised image composed of a matrix of image samples to provide a compressed image which satisfies a predefined bit budget, the apparatus comprising:

first signal processing means for dividing the digitised image into blocks and for deriving for each block an energy packing transform comprising a set of transform coefficients;
quantisation means for quantising the coefficients of each transform using a first quantisation table selected from a set of quantisation tables;
second signal processing means for deriving an index representative of the number of zero-value quantised transform coefficients, for determining a predicted zero-value index using said predefined bit budget, for selecting a quantisation table from said set of tables using the derived index and said predicted index and using that selected table to quantise the coefficients of each transform; and
encoding means for compressing the coefficients quantised by the second signal processing means using run-length encoding.

The apparatus of the present invention may be incorporated into a mobile communication device, for example a cellular phone.

BRIEF DESCRIPTION OF THE DRAWINGS

For a better understanding of the present invention and in order to show how the same may be carried into effect reference will now be made, by way of example, to the accompanying drawings, in which:

FIG. 1 shows a block diagram of a DCT-based lossy encoder according to the prior art;

FIG. 2 shows a block diagram of a DCT-based lossy encoder according to an embodiment of the present invention;

DETAILED DESCRIPTION

The general architecture of a DCT-based encoder embodying the present invention is shown in FIG. 2. This is a modification of the encoder already described with reference to FIG. 1, and like parts are identified with the same reference numbers. The encoder is suitable for use in the compression of still frames in accordance with the JPEG standard, although it may also be used to satisfy other compression standards and methods. A conventional decoder may be used to decode images compressed with this encoder.

The encoder of FIG. 2 comprises a modified quantisation table selection unit 11. This is arranged to store a look-up table or other representation of the relationship between the size of a compressed image (termed the 'bit budget') and an index termed the 'zero-value' index. As has already been explained above, the DCT obtained for each block 3 of an image 2 contains a set of DCT coefficients, a large number of which may be zero after quantisation. For a given image, the zero-value index of that image is determined by counting the number of zero-value quantised coefficients in each DCT, and determining the average number of zero-value coefficients per DCT.

The stored relationship is constructed using a number of library or test images, chosen to be representative of a number of different styles, for example images containing little detail, e.g. sky, and images containing a large amount of detail, e.g. landscapes. Each test image is processed by sub-dividing the image into blocks and determining the DCT for each block. This set of DCTs is then quantised with each of the quantisation tables (Q=1 to 100) in turn, where the tables are generated from the base table (Q=50) using the following relationships:

$$\text{for } Q < 50; \quad k = \frac{5000}{Q}; \quad TB_Q[i,j] = \frac{TB_{50}[i,j] \cdot k + 50}{100}$$

$$\text{for } Q > 50; \quad k = 200 - 2Q; \quad TB_Q[i,j] = \frac{TB_{50}[i,j] \cdot k + 50}{100}$$

where $TB_{50}[i,j]$ is the quantisation step for the base table element in the i th row and the j th column and $TB_Q[i,j]$ is the quantisation step for the new table element in the i th row and the j th column. $TB_Q[i,j]$ are in practice also rounded to the nearest integer.

Figure 3:
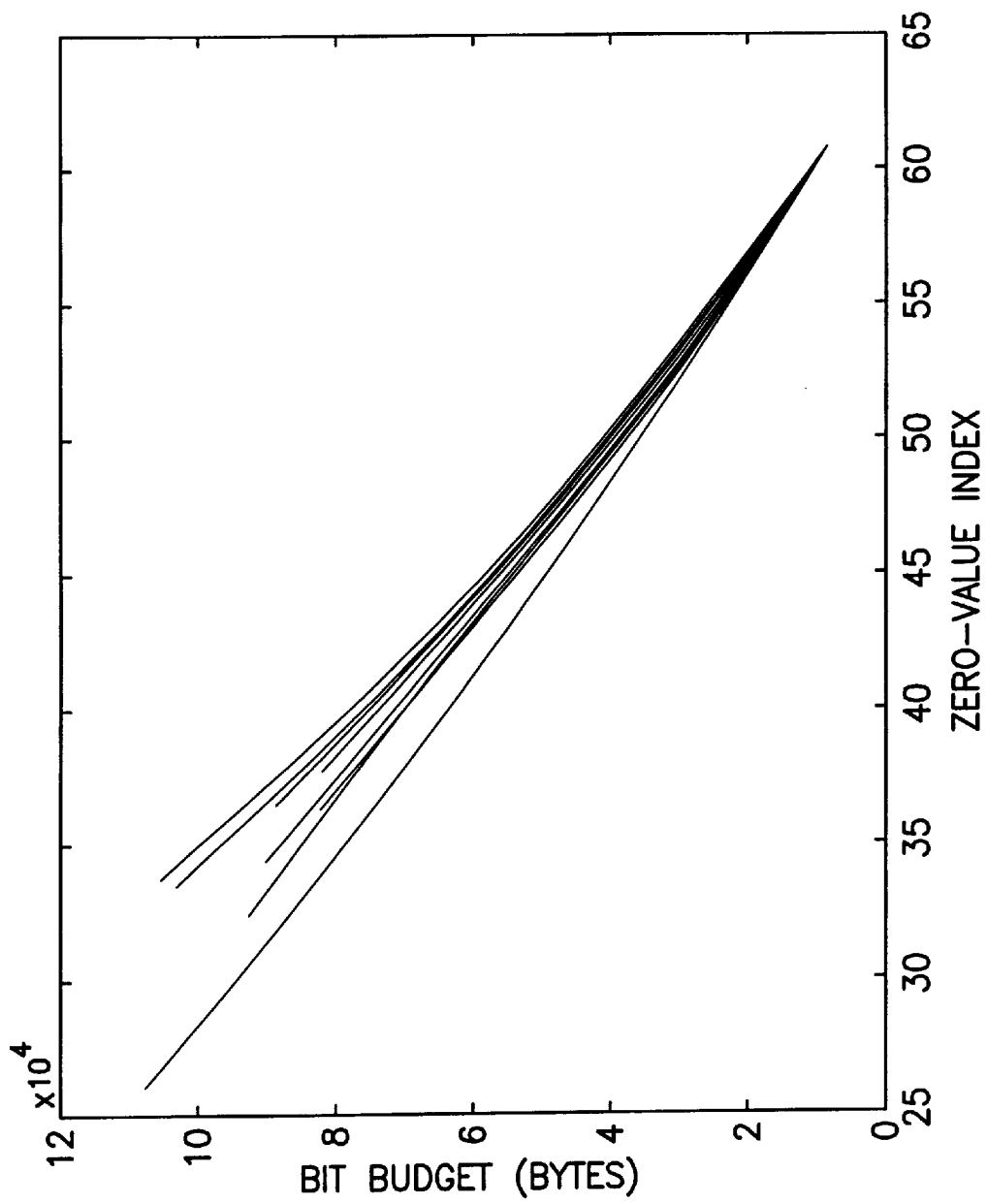
FIG. 3 shows byte-size vs zero-value index relationships for respective test images.

The resulting quantised DCTs are encoded using run-length encoding and entropy encoding (i.e. Huffman encoding). The size of the compressed image (bit budget) is then determined. In addition, the zero-value index is calculated for each set of quantised DCTs. FIG. 3 shows the zero-value index vs bit budget for a number of different test images. This set of relationships is then averaged to generate an archetypal relationship. It is found that in general the zero-value index vs bit budget relationship of an image deviates little from the archetypal relationship.

The archetypal relationship is stored as already described in the modified quantisation table selection unit 11, typically as a look up table. A new digitised image to be compressed is passed, block by block, to the FDCT 4 to generate a DCT for each block. A quantisation table corresponding to Q=97 is generated by the modified quantisation table selection unit 11, from the table specification memory 6, for use by the quantiser unit 5 to quantise each DCT in turn. The number of zero-value coefficients in each DCT is then determined and the zero-value index calculated.

Figure 4:
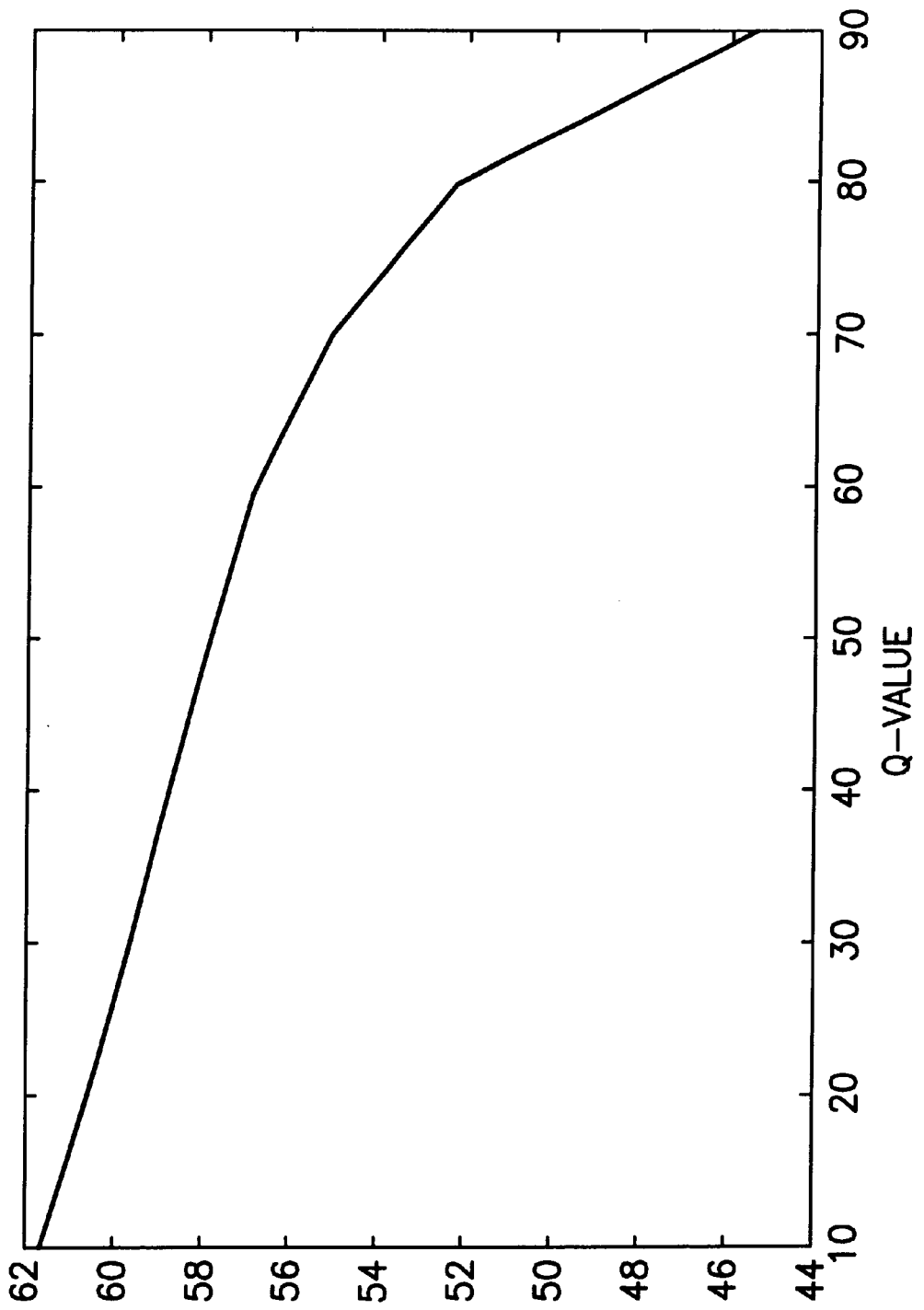
FIG. 4 shows the zero-value indices obtained with a number of different quantisation tables (Q) for an image to be compressed.

Using the set of quantised DCTs, it is also possible to determine the zero-value index for lower Q values. For example, it can be seen that all coefficients $TB_{97}[i,j]$ having the value 1 will have the value 0 after quantisation with Q=91. It is therefore only necessary to count the number of 0's and 1's in each DCT with Q=97, and find the average per block, to determine the zero-value index for Q=91. There is shown in FIG. 4 a plot of Q value vs zero-value index for one particular image.

Assuming that a particular bit budget has been predefined (BB) for the compression stage, the relationship illustrated in FIG. 3 and held by the quantisation table selection unit 11, can be used to identify that zero-value index (a 'predicted' zero-value index) which will meet the bit budget. The identified zero-value index can then in turn be used, in conjunction with the specific relationship of FIG. 4, to identify the Q value which will achieve this bit budget for the image under consideration. The quantisation table corresponding to that Q value is then generated and applied by the quantiser unit 5 to quantise the set of DCTs for the image. The quantised DCTs are then applied to the run length encoder 7 and to the entropy encoder 8 as already described to generate the compressed image.

Figure 5:
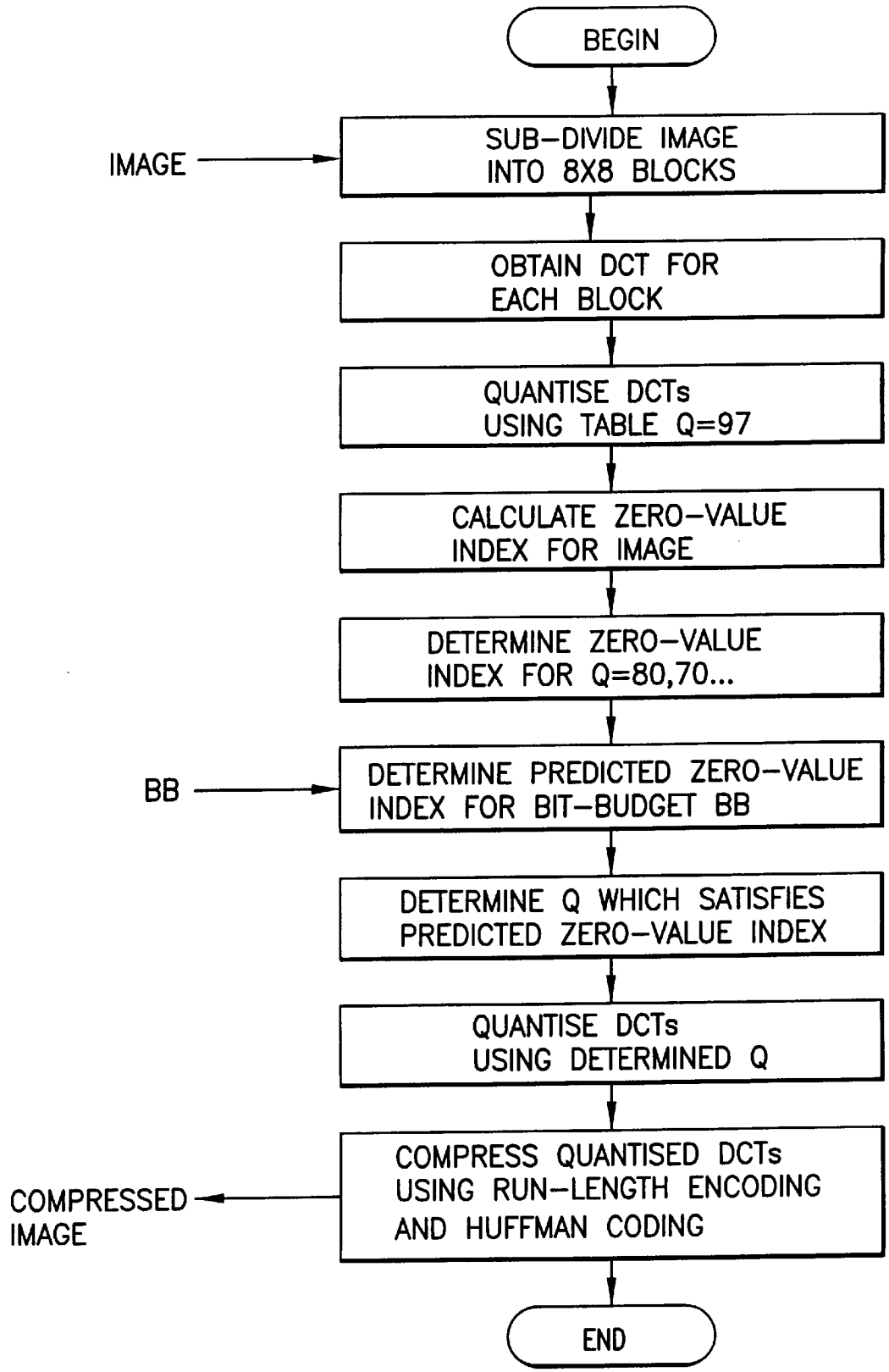
FIG. 5 is a flow diagram illustrating a method of compressing an image.

FIG. 5 is a flow diagram illustrating the method described above.

It will be appreciated by the skilled person that modifications may be made to the above described embodiment without departing from the scope of the present invention.

What is claimed is:

1. A method of compressing a digitised image composed of a matrix of image samples to provide a compressed image which satisfies a predefined bit budget, the method comprising the steps of:

1) dividing the digitised image into blocks and deriving for each block an energy packing transform comprising a set of transform coefficients;
2) selecting a quantisation table from a set of quantisation tables and using the selected table to quantise the coefficients of each transform;
3) deriving a zero-value index indicative of the number of zero-value quantised transform coefficients;
4) determining a predicted zero-value index using said predefined bit budget;
5) selecting a quantisation table from said set of tables using the derived index and said predicted index and using that selected table to quantise the coefficients of each transform; and
6) compressing the coefficients quantised in step 5) using run-length encoding.

2. A method according to claim 1, wherein said zero-value index is the average number of zero-value quantised transform coefficients per transform.

3. A method according to claim 1, wherein step 3) comprises deriving zero-value indices for each of a plurality of different quantisation tables to provide a zero-value index vs quantisation table relationship.

4. A method according to claim 1 and comprising obtaining a reference zero-value index vs bit budget relationship by:

7) dividing a digitised test image into blocks and deriving for each block an energy packing transform comprising a set of transform coefficients;
8) selecting a quantisation table from a set of quantisation tables and using the selected table to quantise the coefficients of each transform;
9) deriving a zero-value index indicative of the number of zero-value quantised transform coefficients;
10) compressing the coefficients quantised in step 5) using run-length encoding;
11) determining the bit size of the compressed image;
12) repeating steps 7) to 11) for a plurality of different quantisation tables to obtain a zero-value vs bit size relationship for the test image; and
13) repeating steps 7) to 12) for a plurality of different test images and combining the resulting relationships to obtain the reference zero-value index vs bit budget relationship,
wherein this relationship is used in step 4) to determine the predicted zero-value index using the predefined bit budget.

5. A method according to claim 4, wherein step 5) comprises using the predicted zero-value index and the zero-value index vs quantisation table relationship for the image to be compressed, to select the quantisation table.

6. A method according to claim 1, wherein said energy packing transform is a discrete cosine transform (DCT).

7. A method according to claim 1, wherein step 6) comprises entropy encoding the data after run-length encoding.

8. Apparatus for compressing a digitised image composed of a matrix of image samples to provide a compressed image which satisfies a predefined bit budget, the apparatus comprising:

first signal processing means for dividing the digitised image into blocks and for deriving for each block an energy packing transform comprising a set of transform coefficient;
a quantisation table specification memory storing a set of quantisation tables;

quantisation means for quantising the coefficients of each transform using a first quantisation table selected from said set of quantisation tables;

second signal processing means for deriving an index representative of the number of zero-value quantised transform coefficients, for determining a predicted zero-value index using said predefined bit budget, for selecting a quantisation table from said set of tables using the derived index and said predicted index and using that selected table to quantise the coefficients of each transform; and encoding means for compressing the coefficients quantised by the second signal processing means using run-length encoding.

* * * * *